US 6,791,604 B1

(12) United States Patent
Lama et al.

(10) Patent No.: US 6,791,604 B1
(45) Date of Patent: Sep. 14, 2004

(54) ELECTRONIC CAMERA

(75) Inventors: Chin-Loo Lama, Bolton, MA (US);
Hiroyuki Sakayauchi, Hachioji (JP);
Tatsutoshi Hashimoto, Machida (JP)

(73) Assignees: Polaroid Corporation, Waltham, MA (US); Olympus Optical Company, Ltd., Tokyo (JP)

( * ) Notice: Subject to any disclaimer, the term of this patent is extended or adjusted under 35 U.S.C. 154(b) by 831 days.

(21) Appl. No.: 09/621,587

(22) Filed: Jul. 21, 2000

(51) Int. Cl.⁷ .............................................. H04N 5/225
(52) U.S. Cl. .................. 348/207.2; 348/373; 358/906
(58) Field of Search ........................... 348/207.2, 373; 358/906; 396/30, 40

(56) References Cited

U.S. PATENT DOCUMENTS 4,937,676 A * 6/1990 Finelli et al. ............... 348/375
6,476,863 B1 * 11/2002 Silverbrook ............. 348/231.9

* cited by examiner

Primary Examiner—Andrew Christensen
Assistant Examiner—Gary Solomon (57) ABSTRACT

An electronic camera of the present invention includes a paper exit opening for removal of printed paper provided on the upper surface of the case of the camera main body, a protection sheet having a base end fixed to the inside of the paper exit opening, with a free end revertible to a wound-up roll shape retracted inside the case, and capable of being extended by the front end of the printed paper when the printed paper is transported from the case to the outside so that the protection sheet covers the photosensitive surface of the paper, and an open-and-close lid having one end edge axially supported to be rotatable to the case so that the paper exit opening is closed from the outside of the case when the protection sheet is retracted within the case. Further, the protection sheet includes a linking mechanism for linking the protection sheet to the open-and-close lid so that the open-and-close lid is opened or closed interlocked with a movement of the protection sheet.

10 Claims, 5 Drawing Sheets

ELECTRONIC CAMERA

BACKGROUND OF THE INVENTION

The present invention relates to a printer-incorporated electronic camera capable of instantly printing an image of an image-captured object onto a self-development type photosensitive printing medium with the incorporated printer.

An electronic camera has a superior advantage to a conventionally widely-used camera using a silver-salt type film in that it is possible to instantly regenerate and display a captured image. Further, when this electronic camera incorporates a printer capable of instantly printing a captured image onto a suitable receiving medium, the range of application and utilization of the electronic camera expands substantially. From this viewpoint, a printer-incorporated electronic camera has been developed for practical use.

A conventional printer-incorporated electronic camera has the following problems. This type of electronic camera has a slit-shaped paper exit opening for removing paper printed with a captured image from a case of a camera main body to the outside. In many cases, this paper exit opening is provided on the upper surface of the case of the camera main body to avoid friction with the surrounding as far as possible at the time of the removal of the printed paper. In general, this paper exit opening has a size to allow a printed paper to be removed and is provided always in an open state.

Therefore, according to the conventional printer-incorporated electronic camera, there is a risk that external light enters the camera main body from the paper take-out opening, and unnecessarily exposes the photosensitive surface of the printing paper. Further, there is also a risk of dust, sand, grit, particles, and like contaminants entering the camera main body from the paper take-out opening and causing unexpected trouble.

As a conventional electronic camera of this type, there is also one that has a protection sheet for protecting the photosensitive surface of a printed paper that is removed through the paper exit opening.

The electronic camera having a protection sheet is structured such that a protection sheet wound up in a roll shape is mounted near the paper exit opening in advance, and when the printed paper is removed, the front end of the printed paper extends a free end of the protection sheet so that the protection sheet covers the photosensitive surface of the printed paper.

The electronic camera having a protection sheet solves the above problem to some extent as compared with an electronic camera having no protection sheet. However, as the protection sheet is not designed for closing the opening, there is no guarantee that the paper exit opening is always securely closed by the protection sheet wound up in the roll shape. Further, as the protection sheet has flexibility, the roll diameter of the protection sheet in a wound-up state is not constant. As a result, there arises a variance in the size and shape of a gap generated between the wound-up protection sheet and the paper exit opening.

BRIEF SUMMARY OF THE INVENTION

It is an object of the present invention to provide a printer-incorporated electronic camera having the following advantages:

(a) Risk that external light enters from a paper take-out opening and unnecessarily exposes the photosensitive surface of a printing paper contained therein is minimized, as is the risk that dust, sand, grit, particles, and like contaminants enter the camera main body; and (b) There is no increase in the size of the camera main body and no increase in its cost.

In order to achieve the above objects, there is described herein an electronic camera capable of printing an image of an image-captured object onto a printing paper and transporting the printed paper to the outside of a case of a camera main body, the electronic camera comprising:

a paper exit opening for removing the printed paper provided on the upper surface of the case of the camera main body as viewed from the front side of the camera main body;

a protection sheet having a base end fixed to the inside of the paper exit opening, with a free end excluding the base end always wound up in a roll shape by a self-restoring force so as to be accommodated inside the case, and having the free end in the wound-up state to be extended by the front end of the printed paper when the printed paper is removed from the case to the outside so that the protection sheet covers the photosensitive surface of the paper; and an open-and-close lid having one end edge of a square plate axially supported to be rotatable to the case so that the paper exit opening is closed from the outside of the case in a state that the protection sheet is accommodated within the case by being wound up in a roll shape.

In a desirable embodiment of the present invention, the electronic camera has a linking mechanism for linking the protection sheet to the open-and-close lid so that the open-and-close lid is opened or closed interlocked with a movement of the protection sheet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are diagrams showing structures of main portions of the electronic camera according to the embodiment of the invention. Particularly.

FIGS. 3A and 3B are diagrams showing a linking mechanism, a protection sheet and an open-and-close lid, mutually related to each other, of the electronic camera according to the embodiment of the invention.

FIG. 6 is a diagram showing an operation of the electronic camera according to the embodiment of the invention. Particularly.

FIG. 7 is a diagram showing an operation of the electronic camera according to the embodiment of the invention. Particularly, FIG. 8 is a diagram showing an operation of the electronic camera according to the embodiment of the invention. Particularly.

DETAILED DESCRIPTION OF THE INVENTION

Figure 1:
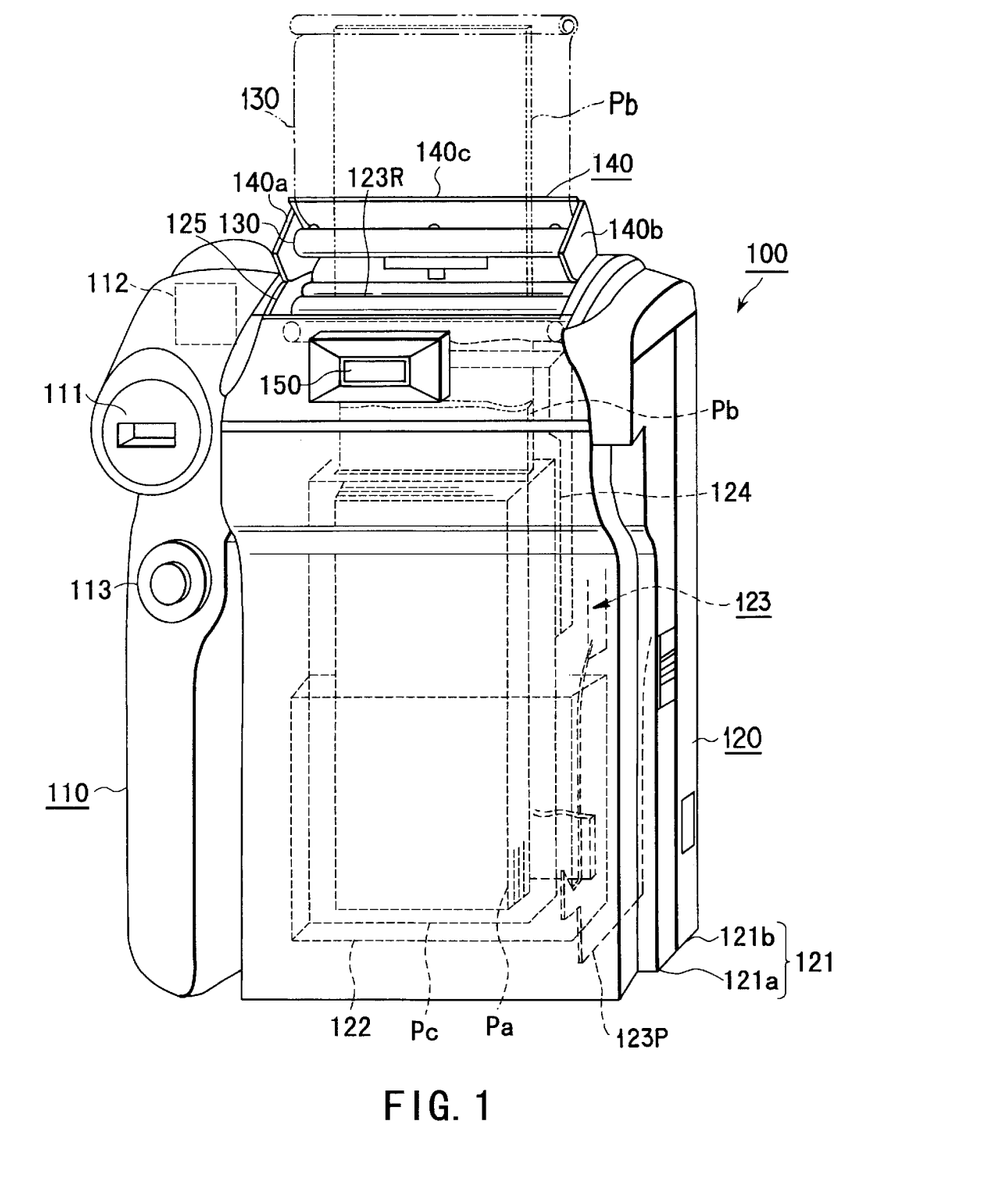
FIG. 1 is a diagram showing a schematic structure of an electronic camera according to one embodiment of the present invention, and is particularly a perspective view of a camera main body viewed from the front side.

As shown in FIG. 1, a camera main body 100 has broadly two portions of a photographing unit 110 that is shown on the left side of the drawing, and a printing unit 120 that is shown on the right side of the drawing.

The photographing unit 110 includes a photographing lens 111 for "taking in" an optical image of an object brought into position in front of the camera main body 100, a CCD imaging device 112 for converting an optical image of an object taken in by the photographing lens 111 into a correspondent electric signal and for distributing such image information, and a release button 113 for commencing the camera's photographic operation.

The printing unit 120 has a rectangular parallelepiped case 121 integrally formed by a front cover 121a and a rear cover 121b. The printing unit 120 includes inside this case 121, a cartridge accommodation chamber 122 for accommodating a paper cartridge PC storing self-development type photosensitive printing papers Pa, a paper carrying mechanism 123 that includes a pick-up mechanism 123P, a pair of carrying rollers (not shown) and a pair of feed rollers 123R for the removed and transport of the printing papers Pa one by one from the paper cartridge PC, and a printer 124 for printing an image corresponding to image information obtained by the photographing unit 110 onto the printing paper Pa carried by the paper carrying mechanism 123. The pick-up mechanism 123P includes a pick-up plate which has a pick-up claw and which can move up and down. This pick-up mechanism 123P picks up each printing paper Pa to feed the upper end of the printing paper Pa to the carrying rollers.

Further, the printing unit 120 includes a paper exit opening 125 for the removal of a printed paper Pb printed by the printer 124 from the case 121 to the outside, a protection sheet 130 for protecting a photosensitive surface of the printed paper Pb taken out from the paper take-out opening 125, and an open-and-close lid 140 having one end edge of a long side of a square plate 140c axially supported to be rotatable to the case 121 so that the paper take-out opening 125 can be closed from the outside of the case 121, in a state that the protection sheet 130 is accommodated within the case 121 by being wound up in a roll shape.

The protection sheet 130 will be described in detail later, and therefore, only the outline will be briefly explained here. The protection sheet 130 is formed by, for example, an elastic sheet-shaped plastic material. The base end of the protection sheet 130 is fixed to the inside of the case 121 as described later. The free end of the protection sheet 130 has a spring-like resiliency that imparts to the free end a natural tendency to wind itself up into a roll-shaped winding state. It is preferable that the inner surface of the protection sheet 130 has a black color.

The open-and-close lid 140 is formed by mainly the square plate 140c slightly bent in an arc shape. This square plate 140c has its one end edge of the long side axially supported so that its left and right sides can rotate to the case 121.

On the left and right sides of the square plate 140c of the open-and-close lid 140, there are provided light-shielding pieces 140a and 140b respectively for shielding lights from entering the paper exit opening 125 through both sides of the open-and-close lid when the open-and-close lid 140 is opened.

The case 121 of the printing unit 120 accommodates a battery as a power source, a printed circuit substrate mounted with various parts for control, etc., although not shown in the drawing. On the upper part of the front surface of the case 121, a stroboscopic unit 150 is provided.

Figure 2A:
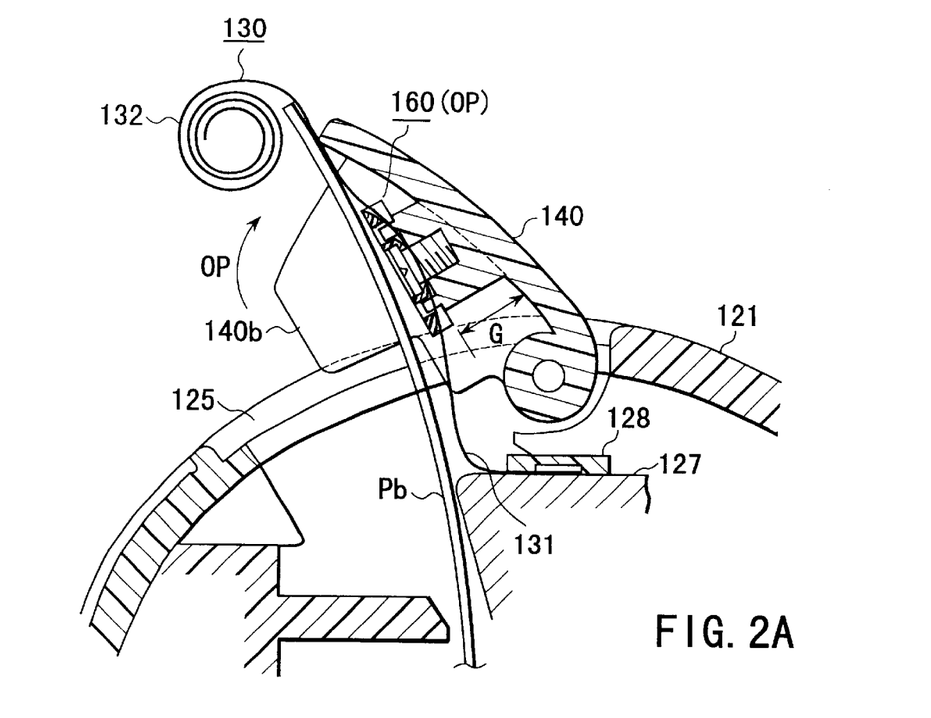
FIG. 2A is a longitudinal sectional view showing a state that an open-and-close lid has been opened.
Figure 2B:
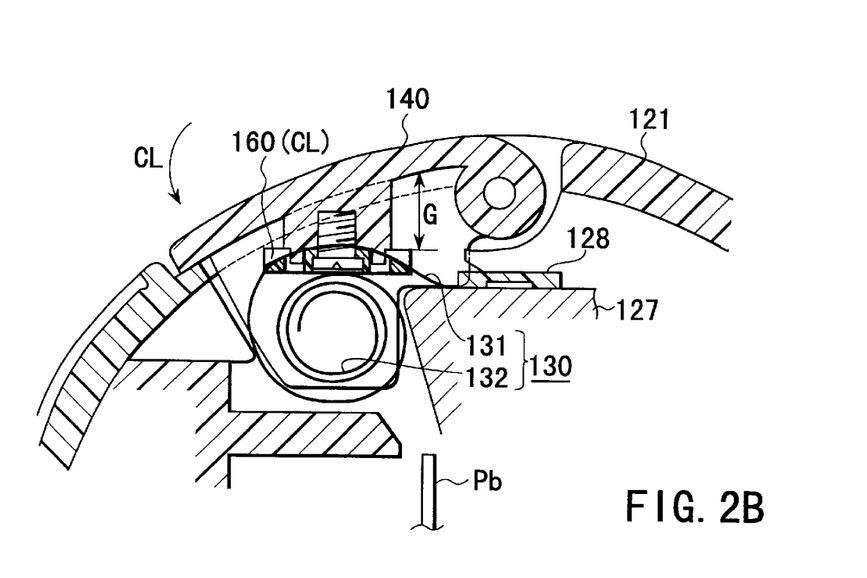
FIG. 2B is a longitudinal sectional view showing a state that the open-and-close lid has been closed.

FIG. 2A is a longitudinal sectional view showing the state in which the open-and-close lid 140 has been opened, and FIG. 2B is a longitudinal sectional view showing the state in which the open-and-close lid 140 has been closed. As shown in FIGS. 2A and 2B, a base end 131 of the protection sheet 130 is fixed to the upper surface of an installation base 127 provided inside the case 121, by a fixing member 128.

The free end 132 excluding the base end 131 of the protection sheet 130 is retracted in a roll shape within the case 121 when an external force is not being applied to the free end 132, as shown in FIG. 2B. When the printed paper Pb is being removed from the case 121, the free end 132 is brought into an extended state as the free end 132 is pushed out of the case 121 by the upper end of the printed paper Pb, as shown in FIG. 2A. In this case, the protection sheet 130 covers the photosensitive surface of the printed paper Pb (the right side in the drawing) so that the photosensitive surface is protected.

As described later, when the printed paper Pb taken out from the case 121 has been completely extracted from the case 121 by a user, the free end 132 winds up itself based on its spring-like resiliency and is thus retracted back within the case 121.

The inner surface of the open-and-close lid 140 and a part of the protection sheet 130, that is, a portion near the base end of the protection sheet 130, are linked with each other by a linking mechanism 160. The open-and-close lid 140 is opened or closed interlocked with the movement of the protection sheet 130. The linking mechanism 160 has an open-and-close lid opening unit OP and an open-and-close lid closing unit CL.

The open-and-close lid opening unit OP is a unit for opening the open-and-close lid 140 interlocked with the extension of the protection sheet 130 when the protection sheet 130 is being extended by the front end of the printed paper Pb, when the printed paper Pb is going to be taken out, as indicated by an arrow mark OP in FIG. 2A.

The open-and-close lid closing unit CL is a unit for closing the open-and-close lid 140 interlocked with the winding of the protection sheet 130 when the protection sheet 130 is wound up by the self-restoring force and is going to be accommodated within the case 121, when the printed paper Pb has been taken out from the case 121 to the outside, as indicated by an arrow mark CL in FIG. 2B.

Figure 3A:
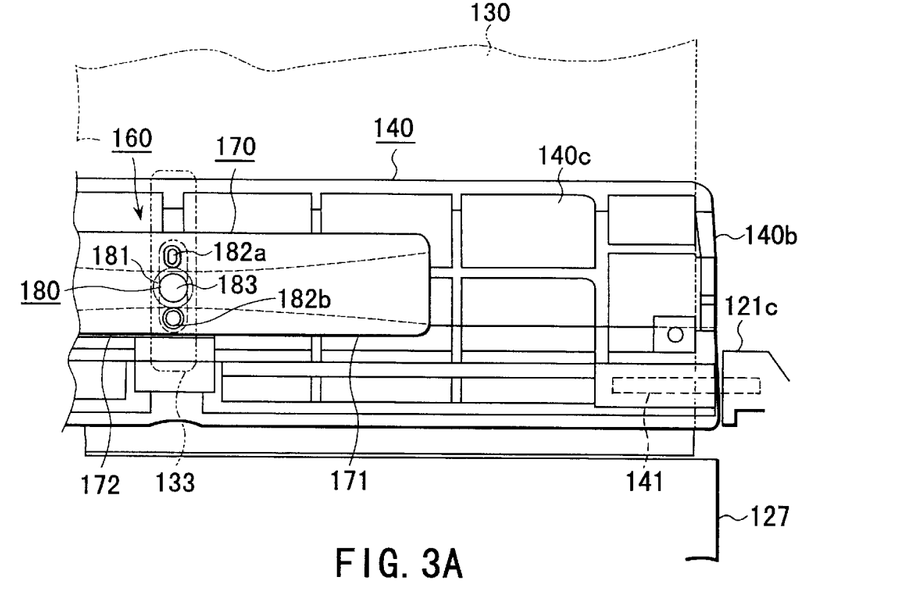
FIG. 3A shows a state that the open-and-close lid has been opened, and FIG. 3A particularly shows only a right half portion of the camera main body as viewed from the front side.
Figure 3B:
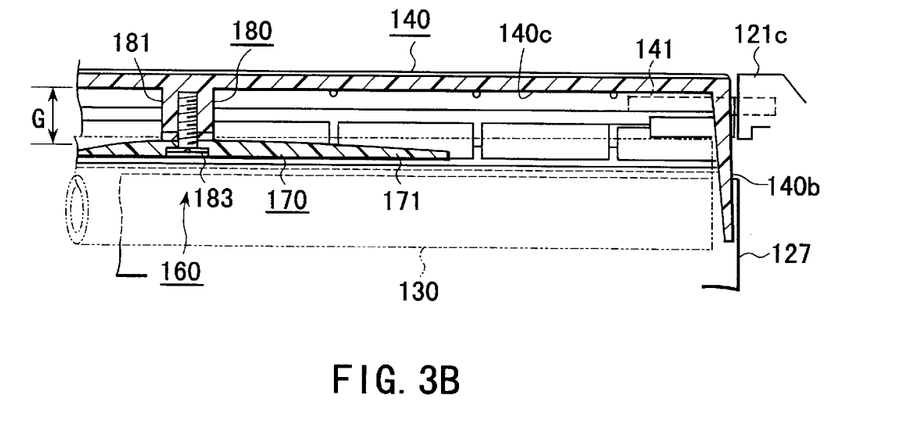
FIG. 3B shows a state that the open-and-close lid has been closed, and FIG. 3B particularly shows only the right half portion of the camera main body as viewed from the front side.

FIGS. 3A and 3B are diagrams showing the linking mechanism 160, the protection sheet 130 and the open-and-close lid 140 mutually related to each other. FIG. 3A shows the state in which the open-and-close lid 140 has been opened, and FIG. 3B shows the state in which the open-and-close lid 140 has been closed. FIGS. 3A and 3B correspond to FIGS. 2A and 2B respectively.

Figure 4:
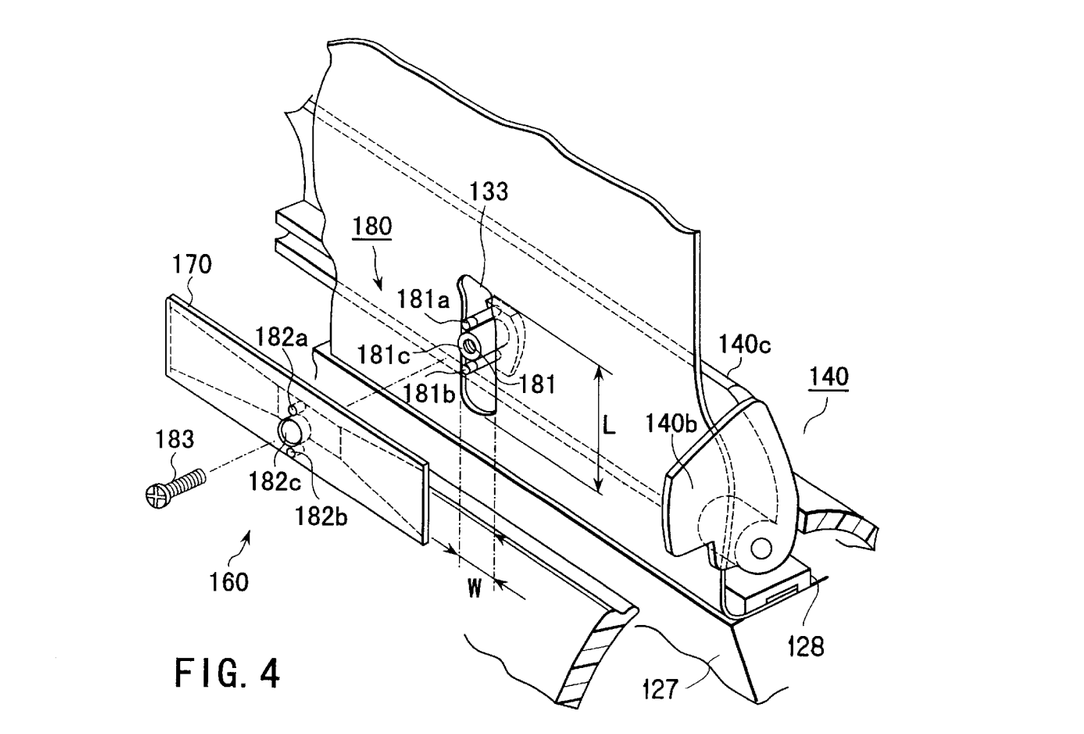
FIG. 4 is an exploded perspective view showing a structure of the linking mechanism, together with its peripheral members, of the electronic camera according to the embodiment of the invention.
Figure 5:
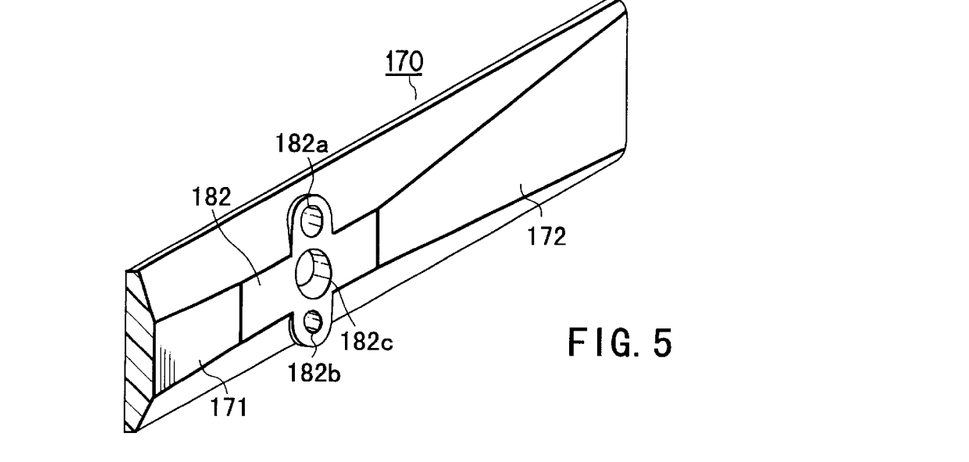
FIG. 5 is a perspective view showing a partly cut portion of only a sheet holder of the linking mechanism of the electronic camera according to the embodiment of the invention.

FIG. 4 is an exploded perspective view showing the detailed structure of the linking mechanism 160 together with the protection sheet 130 and the open-and-close lid 140. FIG. 5 is a perspective view showing a partly cut portion of the sheet holder 170 of the linking mechanism 160.

As shown in FIGS. 3A, 3B, 4 and 5, both ends of one end edge of the square plate 140c of the open-and-close lid 140 (the lower end edge in FIG. 3A) are rotatably supported by a rotary axis 141. The rotary axis 141 is supported by an axis support 121c formed between the front cover 121a and the rear cover 121b of the case 121.

The linking mechanism 160 has a sheet holder 170. The sheet holder 170 is disposed in parallel with the rotary axis 141 of the open-and-close lid 140 and opposite to the inner surface of the open-and-close lid 140 with a gap G through which at least the protection sheet 130 can pass as shown in FIG. 3B (also refer to FIGS. 2A and 2B). The sheet holder 170 has substantially a rectangular shape in total, and has wings 171 and 172 on its both ends. In other words, a cross section that is orthogonal with a longitudinal direction of the sheet holder 170 has a shape similar to wings of an aircraft (reference FIG. 5). A tapered surface forming a pyramid shape of each of the wings 171 and 172 faces the inner surface of the protection sheet 130 that is wound up in a roll shape. This sheet holder 170 is fixed to the open-and-close lid 140 by a fixing mechanism 180.

The fixing mechanism 180 is structured as follows. A supporting block 181 as a main constituent element of the fixing mechanism 180 is provided in projection at a center on the inner surface of the square plate 140c of the open-and-close lid 140. This supporting block 181 has substantially a short cylindrical shape, with a screw hole 181c provided at the center of the projected end surface. At two opposite positions sandwiching the screw hole 181c on the projected end surface, there are disposed positioning projections 181a and 181b. The projected end surface of the supporting block 181 passes through a slit hole 133 as an opening formed on the protection sheet 130 and is exposed to the inner surface side of the protection sheet 130.

A support portion 182 provided at the center of the sheet holder 170 is connected to the projected end surface of the exposed supporting block 181. A screw hole 182c communicated to the screw hole 181c is provided at the center of the support portion 182. At two opposite positions sandwiching the screw hole 182c, a pair of mesh holes 182a (a long hole) and 182b (a round hole) for positioning are provided so as to be meshed with the positioning projections 181a and 181b respectively.

The mesh holes 182a and 182b of the sheet holder 170 are meshed with the positioning projections 181a and 181b of the supporting block 181 respectively to have the connected state. A fixing screw 183 is inserted into the through hole 182c and is fastened into the screw hole 181c, so that the sheet holder 170 is fixed to the supporting block 181 with the screw. In this way, the sheet holder 170 is fixed to the open-and-close lid 140 in a detachable state by the fixing mechanism 180.

A width W of the slit hole 133 formed on the protection sheet 130 is slightly larger than the width of the supporting block 181. A length L of the slit hole 133 is sufficiently larger than the length of the supporting block 181, with large room.

The operation of the electronic camera having the above-described structure will be explained with reference to FIGS. 1 to 5, FIGS. 6 and 7 as appropriate. When an image corresponding to image information taken in by the photographing unit 110 has been printed onto the photosensitive printing paper Pa by the incorporated printer 124, the paper carrying mechanism 123 starts carrying the printed paper Pb. Then, the printed paper Pb moves toward the paper take-out opening 125 as indicated by an arrow mark M1 in FIG. 6. When the front end of the printed paper Pb has reached the winding portion of the free end 132 of the protection sheet 130 accommodated inside the paper take-out opening 125 in a rolled-up shape, the free end 132 is pushed upward by the front end of the printed paper Pb as shown in the drawing.

Figures 6, 7, 8:
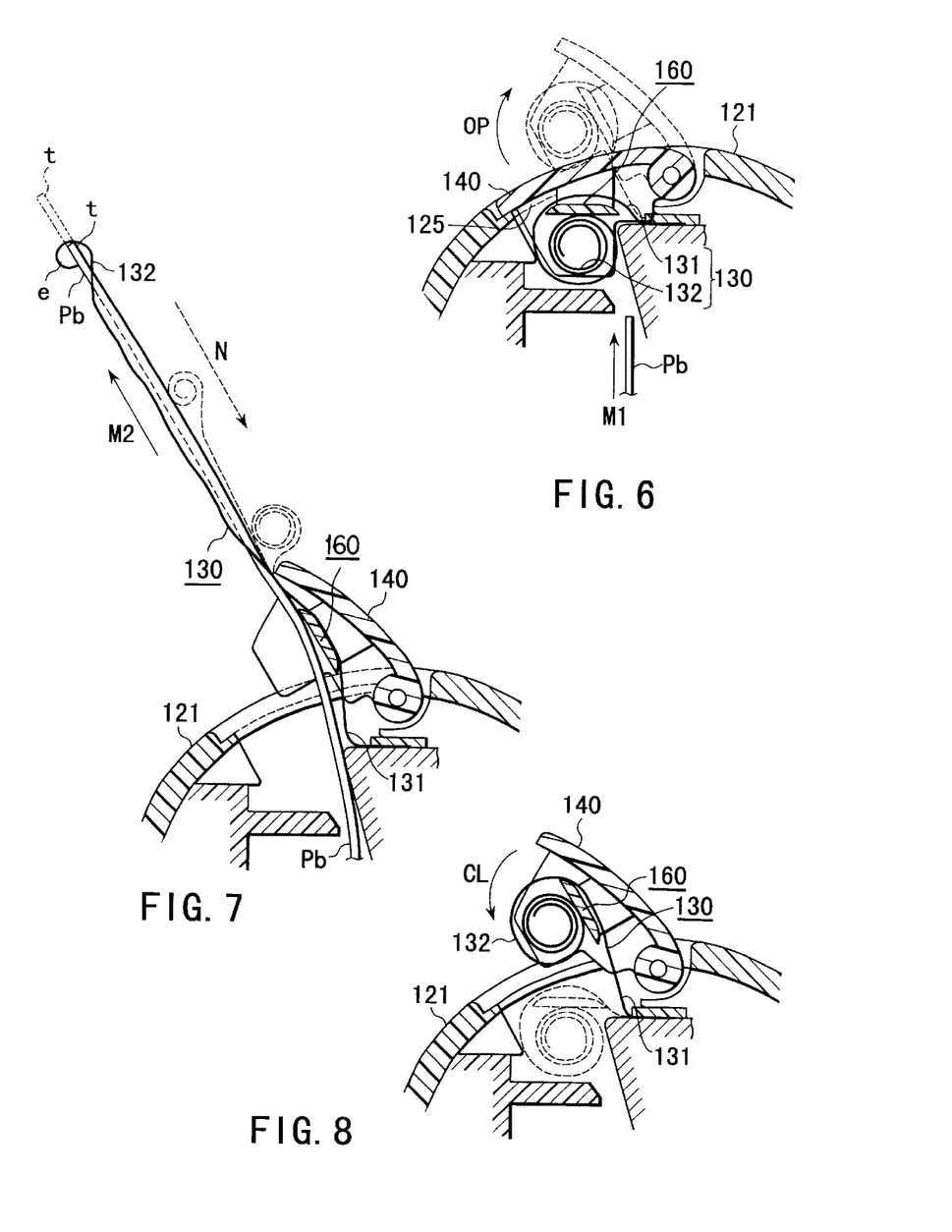
FIG. 6 is a longitudinal sectional view showing a state that a printed paper has started to be taken out from the camera main body.
FIG. 7 is a longitudinal sectional view showing a state that the printed paper has been taken out from the camera main body while extending the protection sheet.
FIG. 8 is a longitudinal sectional view showing a state that the printed paper is being taken out from the case of the camera main body.

At this time, the open-and-close lid 140 linked with the protection sheet 130 by the linking mechanism 160 is interlocked with the push-up operation of the protection sheet 130 as indicated by an arrow mark OP in FIG. 6, to have a state as shown by a broken line. As the light shielding pieces 140a and 140b are provided on the left and right sides of the square plate 140c of the open-and-close lid 140, it is possible to shield light from entering the paper exit opening 125 through both sides of the open-and-close lid even if the open-and-close lid 140 is in the opened state.

Then, the free end 132 is sent out in a direction of an arrow mark M2 shown in FIG. 7 while being extended toward the outside of the case 121 by the front side of the printed paper Pb. Thus, the photosensitive surface of the printed paper Pb (the right side in FIG. 7) is covered by the free end 132 of the protection sheet 130. As the left and right side edges of the protection sheet 130 are also slightly curled toward the inner surface as shown in FIG. 7, the photosensitive surface is protected more securely. As a result, it is possible to avoid external light from directly irradiating the photosensitive surface, and it is also possible to prevent contaminants from contacting the photosensitive surface.

A printed paper Pb indicated by a solid line in FIG. 7 shows the state immediately prior to removal of the printed paper Pb. In this state, the front end e of the free end 132 of the protection sheet 130 is still caught by the front end t of the printed paper Pb.

A printed paper Pb indicated by a broken line in FIG. 7 shows the state after removal of the printed paper Pb. As shown in the drawing, when the printed paper Pb has been removed, the front end e of the free end 132 of the protection sheet 130, previously caught by the front end t of the printed paper Pb, becomes liberated as shown by the broken line. Then, the free end 132 is wound up straight to a position near the open end of the open-and-close lid 140 by the aforementioned spring-like resiliency of the free end 132 as indicated by an arrow mark N.

When a user has removed the printed paper Pb, the free end 132 of the protection sheet 130 winds up by itself in a roll shape, and is thus retracted back into the case 121, as shown by the broken line in FIG. 8.

In this case, the open-and-close lid 140 linked to the protection sheet 130 by the linking mechanism 160 reverts back to its closed state interlocked with the winding operation of the protection sheet 130, as indicated by an arrow mark CL.

As explained above, according to the present embodiment, the open-and-close lid 140 is in a closed state during a period other than when the printed paper Pb is being taken out. Therefore, there is little risk that external light will enter inside the camera main body 100 from the paper exit opening 125. The entry of dust, sand, grit, and other like contaminating particulate matter is also discouraged.

When the removal of the printed paper Pb has been started, the open-and-close lid 140 is automatically opened interlocked with the extension of the protection sheet 130. At this time, as the light shielding pieces 140a and 140b are provided on the left and right sides of the open-and-close lid 140, it is possible to shield lights from entering the paper exit opening 125 through both sides of the open-and-close lid. Further, when the removal of the printed paper Pb has been completed and the printed paper Pb has been retrieved by the user, the open-and-close lid 140 is automatically closed interlocked with the self-winding movement of the protection sheet 130. Thus, the open-and-close lid 140 is automatically opened and closed interlocked with the removal of the printed paper Pb without using any special driving source.

As explained above, while the open-and-close lid 140 in the present embodiment is automatically opened and closed interlocked with the removal of the printed paper Pb, it is not particularly necessary to provide any driving mechanism for driving the open-and-close lid 140. Therefore, there is no compelling reason why the size and/or cost of the camera main body 100 need be increased. Further, while the linking mechanism 160 links the protection sheet 130 to the open-and-close lid 140, they are not fixed. In other words, the gap G is provided to allow the protection sheet to pass through between the sheet holder 170 and the inner surface of the open-and-close lid 140.

Thus, the sheet holder 170 is structured only to hold the protection sheet 130 by avoiding a large deviation of the protection sheet 130 from the inner surface of the open-and-close lid 140.

Although the base end 131 of the protection sheet 130 and the axial core portion of the open-and-close lid 140 are not disposed coaxially, there is no unnecessary force working between the protection sheet 130 and the open-and-close lid 140. Therefore, there is an advantage that the system is not easily damaged when used during a long period.

Further, the width of the slit hole 133 formed on the protection sheet 130 substantially is slightly larger than the width of the supporting block 181, and the length of the slit hole 133 is sufficiently larger than the vertical width (the length) of the supporting block 181. Therefore, the movement of the portion near the base end of the protection sheet 130 is not restricted by the engagement between the slit hole 133 and the supporting block 181. Particularly, a degree of freedom in the longitudinal direction can be secured sufficiently.

The present invention is well-suited to assembly according to several different and innovative embodiments. For example, one embodiment can be defined as: a printer-incorporated electronic camera capable of printing an image of an image-captured object onto a printing paper Pa and removing the printed paper Pb to the outside of a case 121 of a camera main body 100, the electronic camera comprising a paper exit opening 125 for removal of the printed paper Pb provided on the upper surface of the case 121 of the camera main body 100 as viewed from the front side of the camera main body 100; a protection sheet 130 having a base end 131 fixed to the inside of the paper take-out opening 125, with a free end 132 excluding the base end 131 revertible to a wound-up roll shape by its own spring-like resiliency so as to be accommodated inside the case 121, yet having the free end 132 in the wound-up state capable of being extended by the front end of the printed paper Pb when the printed paper Pb is transported from the case 121 to the outside so that the protection sheet 130 covers the photosensitive surface of the paper Pb; and an open-and-close lid 140 having one end edge of a square plate 140a axially supported to be rotatable to the case 121 so that the paper exit opening 125 is closed from the outside of the case 121 when the protection sheet 130 is retracted within the case 121 in its wound-up roll shape.

Another embodiment can be defined as: a printer-incorporated electronic camera capable of printing an image of an image-captured object onto a printing paper Pa and removing the printed paper Pb to the outside of a case 121 of a camera main body 100, the electronic camera comprising a paper exit opening 125 for removal of the printed paper Pb provided on the upper surface of the case 121 of the camera main body 100 as viewed from the front side of the camera main body 100; a protection sheet 130 having a base end 131 fixed to the inside of the paper take-out opening 125, with a free end 132 excluding the base end 131 always revertible to a wound up in a roll shape by its own spring-like resiliency so as to be accommodated inside the case 121, yet having the free end 132 in the wound-up state capable of being extended by the front end of the printed paper Pb when the printed paper Pb is transported from the case 121 to the outside so that the protection sheet 130 covers the photosensitive surface of the paper Pb; an open-and-close lid 140 having one end edge of a square plate 140a axially supported to be rotatable to the case 121 so that the paper exit opening 125 is closed from the outside of the case 121 when the protection sheet 130 is retracted within the case 121 in its wound-up roll shape; and a linking mechanism 160 for linking the protection sheet 130 to the open-and-close lid 140 so that the open-and-close lid 140 is opened or closed interlocked with the movement of the protection sheet 130.

In one variant, the linking mechanism 160 includes an open-and-close lid opening unit OP (Pb, 130, 140) for opening the open-and-close lid 140 interlocked with the extension of the protection sheet 130 when the protection sheet 130 is being extended by the front end of the printed paper Pb, in the course of the removal of the printed paper Pb; and an open-and-close lid closing unit CL (130, 160, 140) for closing the open-and-close lid 140 interlocked with the winding of the protection sheet 130 when the protection sheet 130 is wound up and retracted within the case 121, after removal of the printed paper Pb.

In another variant, the linking mechanism 160 includes a rectangular sheet holder 170 disposed in parallel with a rotary axis 141 of the open-and-close lid 140 and opposite to the inner surface of the open-and-close lid 140 with a gap G through which at least the protection sheet 130 can pass; and a fixing mechanism 180 for fixing the sheet holder 170 to the open-and-close lid 140.

In a further variant of the variant just mentioned, the sheet holder 170 has wings 171 and 172 each having a pyramid-shaped surface that is brought into contact with the inner surface of the protection sheet 130.

Also, independently or additionally, the fixing mechanism 180 can include a supporting block 181 for supporting the sheet holder 170 on the inner surface of the open-and-close lid 140 through an opening (a slit hole 133) formed on the protection sheet 130, and a fixing element (a fixing screw 183) for detachably fixing the sheet holder 170 to the inner surface of the open-and-close lid 140 via the supporting block 181. Engagement members 181a, 181b and 182a, 182b for positioning can be provided between the sheet holder 170 and the supporting block 181. The opening (the slit 133) formed on the protection sheet 130 can also have a length L that is set larger than the length of the supporting block 181 in a direction orthogonal with the rotary axis 141.

In still another embodiment, on the left and right sides of the square plate 140c of the open-and-close lid 140, there are provided light-shielding pieces 140a and 140b respectively for shielding lights from entering the paper exit opening 125 through both sides of the open-and-close lid when the open-and-close lid 140 is opened.

The electronic camera according to the embodiments can be further modified as follows:

(1) An electronic camera wherein an open angle of the open-and-close lid 140 can be changed within a range of 0° to 110°.

(2) An electronic camera having a structure that the rotary axis 141 has been set to the open-and-close lid 140.

(3) An electronic camera wherein the sheet holder 170 has been detachably fitted to the supporting block 181 by an engaging unit.

(4) A printer-incorporated electronic camera using an ink-recording printer to which the present invention has been applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printer-incorporated electronic camera capable of printing an image of an image-captured object onto a printing paper and transporting the printed paper to the outside of a case of a camera main body, the electronic camera comprising:

a paper exit opening for removing the printed paper provided on the upper surface of the case of the camera main body as viewed from the front side of the camera main body;

a protection sheet having a base end fixed to the inside of the paper exit opening, with a free end excluding the base end revertible to a wound-up roll shape retracted inside the case, and capable of being extended by the front end of the printed paper when the printed paper is transported from the case to the outside so that the protection sheet covers the photosensitive surface of the paper; and an open-and-close lid having one end edge of a square plate axially supported to be rotatable to the case so that the paper exit opening is closed from the outside of the case when the protection sheet is retracted within the case in its wound-up roll shape.

2. A printer-incorporated electronic camera capable of printing an image of an image-captured object onto a printing paper and transporting the printed paper to the outside of a case of a camera main body, the electronic camera comprising:

a paper exit opening for removing the printed paper provided on the upper surface of the case of the camera main body as viewed from the front side of the camera main body;

a protection sheet having a base end fixed to the inside of the paper exit opening, with a free end excluding the base end revertible to a wound-up roll shape retracted inside the case, and capable of being extended by the front end of the printed paper when the printed paper is transported from the case to the outside so that the protection sheet covers the photosensitive surface of the paper;

an open-and-close lid having one end edge of a square plate axially supported to be rotatable to the case so that the paper exit opening is closed from the outside of the case when the protection sheet is retracted within the case in its wound-up roll shape; and a linking mechanism for linking the protection sheet to the open-and-close lid so that the open-and-close lid is opened or closed interlocked with a movement of the protection sheet.

3. The electronic camera according to claim 2, wherein the linking mechanism includes:

an open-and-close lid opening unit for opening the open-and-close lid interlocked with the extension of the protection sheet when the protection sheet is being extended by the front end of the printed paper, in the course of the removal of the printed paper; and an open-and-close lid closing unit for closing the open-and-close lid interlocked with the winding of the protection sheet when the protection sheet is wound up and retracted within the case, after removal of the printed paper.

4. The electronic camera according to claim 2, wherein the linking mechanism includes:

a rectangular sheet holder disposed in parallel with a rotary axis of the open-and-close lid and opposite to the inner surface of the open-and-close lid with a gap through which at least the protection sheet can pass; and a fixing mechanism for fixing the sheet holder to the open-and-close lid.

5. The electronic camera according to claim 4, wherein the sheet holder has wings each having a pyramid-shaped surface that is brought into contact with the inner surface of the protection sheet.

6. The electronic camera according to claim 4, wherein the fixing mechanism includes a supporting block for supporting the sheet holder on the inner surface of the open-and-close lid through an opening formed on the protection sheet, and a fixing element for detachably fixing the sheet holder to the inner surface of the open-and-close lid via the supporting block.

7. The electronic camera according to claim 6, wherein engagement members for positioning have been provided between the sheet holder and the supporting block.

8. The electronic camera according to claim 6, wherein the opening formed on the protection sheet has a length that is set larger than the length of the supporting block in a direction orthogonal with the rotary axis.

9. The electronic camera according to claim 1, wherein on the left and right sides of the square plate of the open-and-close lid, there are provided light-shielding pieces respectively for shielding lights from entering the paper exit opening through both sides of the open-and-close lid when the open-and-close lid is opened.

10. The electronic camera according to claim 2, wherein on the left and right sides of the square plate of the open-and-close lid, there are provided light-shielding pieces respectively for shielding lights from entering the paper exit opening through both sides of the open-and-close lid when the open-and-close lid is opened.

* * * * *